(12) United States Patent
Siciliano et al.

(10) Patent No.: US 9,669,733 B2
(45) Date of Patent: Jun. 6, 2017

(54) SELF-INSULATED MODULAR POWER SUPPLY LINE

(71) Applicant: ANSALDO STS S.P.A., Genoa (IT)

(72) Inventors: Vito Siciliano, Monaco (MC); Enzo Sorrentino, Portici (IT); Francesco Ottello, Poggiomarino (IT)

(73) Assignee: ANSALDO STS S.P.A., Genoa (IT)

( * ) Notice: Subject to any disclaimer, the term of this patent is extended or adjusted under 35 U.S.C. 154(b) by 65 days.

(21) Appl. No.: 14/650,258

(22) PCT Filed: Dec. 16, 2013

(86) PCT No.: PCT/IB2013/061003
§ 371 (c)(1),
(2) Date: Jun. 5, 2015

(87) PCT Pub. No.: WO2014/097127
PCT Pub. Date: Jun. 26, 2014

(65) Prior Publication Data
US 2015/0343921 A1    Dec. 3, 2015

(30) Foreign Application Priority Data
Dec. 20, 2012 (IT) .............................. TO2012A1119

(51) Int. Cl.
*B60M 1/00* (2006.01)
*B60M 1/10* (2006.01)

(52) U.S. Cl.
CPC ............ *B60M 1/106* (2013.01); *B60M 1/103* (2013.01)

(58) Field of Classification Search
CPC ........ B60M 1/106; B60M 1/103; B60M 1/00; B60M 1/02; B60M 1/06; B60M 1/12; B60M 1/13
See application file for complete search history.

(56) References Cited

U.S. PATENT DOCUMENTS 4,331,225 A * 5/1982 Bolger .................... B60L 5/005
                                                      191/10
5,810,136 A * 9/1998 Siciliano ................ B60M 1/103
                                                      191/18
(Continued)

FOREIGN PATENT DOCUMENTS

CN    202 180 762        4/2012
EP    0761493            3/1997
(Continued)

OTHER PUBLICATIONS

International Search Report and Written Opinion from International Application No. PCT/IB2013/061003 mailed Aug. 21, 2014.

*Primary Examiner* — Jason C Smith
(74) *Attorney, Agent, or Firm* — Dorsey & Whitney LLP

(57) ABSTRACT

Self-insulated power supply line for vehicles in which a magnetically attractable flexible belt element housed in an insulating casing provides in sequence the power supply to a plurality of conducting elements spaced from one another and external to the casing. A detector circuit is provided adapted to measure the dispersion current which flows between the live conducting element and conducting elements adjacent to it in the case of poor insulation conditions of the road surface.

4 Claims, 3 Drawing Sheets

(56) References Cited

U.S. PATENT DOCUMENTS

| | | | | |
|---|---|---|---|---|
| 6,189,664 B1* | 2/2001 | Siciliano | ................ | B60M 1/103 191/14 |
| 6,209,693 B1* | 4/2001 | Siciliano | ................ | B60M 1/103 191/18 |
| 6,209,694 B1* | 4/2001 | Siciliano | ................ | B60M 1/103 191/18 |
| 6,374,971 B1* | 4/2002 | Siciliano | ................ | H02G 11/02 191/12.4 |
| 6,427,816 B1* | 8/2002 | Siciliano | ................ | B60M 1/103 191/18 |
| 8,365,888 B2* | 2/2013 | Re Fiorentin | ............. | B60L 5/42 191/13 |
| 9,038,796 B2* | 5/2015 | Woronowicz | ........... | B60L 5/005 191/22 C |
| 2015/0343921 A1* | 12/2015 | Siciliano | ................ | B60M 1/106 191/10 |

FOREIGN PATENT DOCUMENTS

| | | |
|---|---|---|
| FR | 2 696 985 | 4/1994 |
| WO | WO 98/36933 | 8/1998 |
| WO | WO 2010/140964 | 12/2010 |

\* cited by examiner

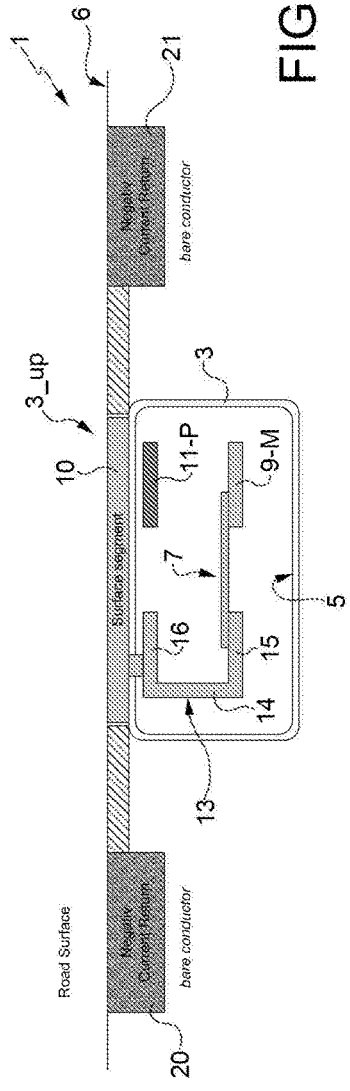
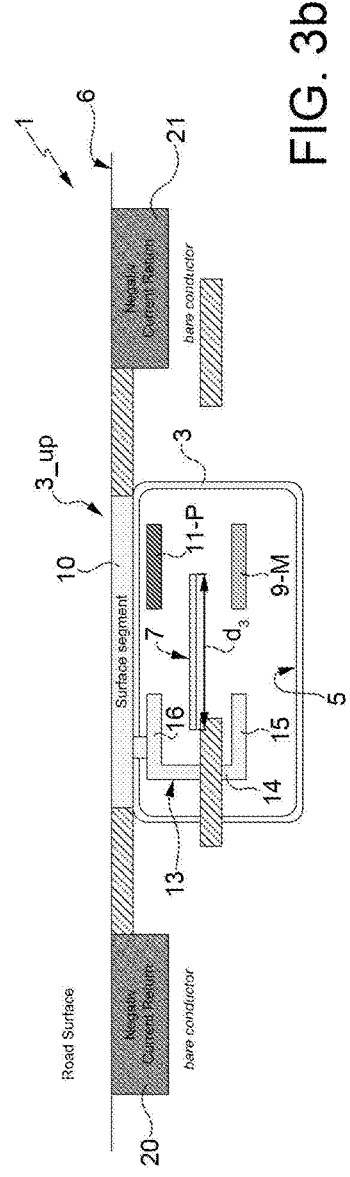
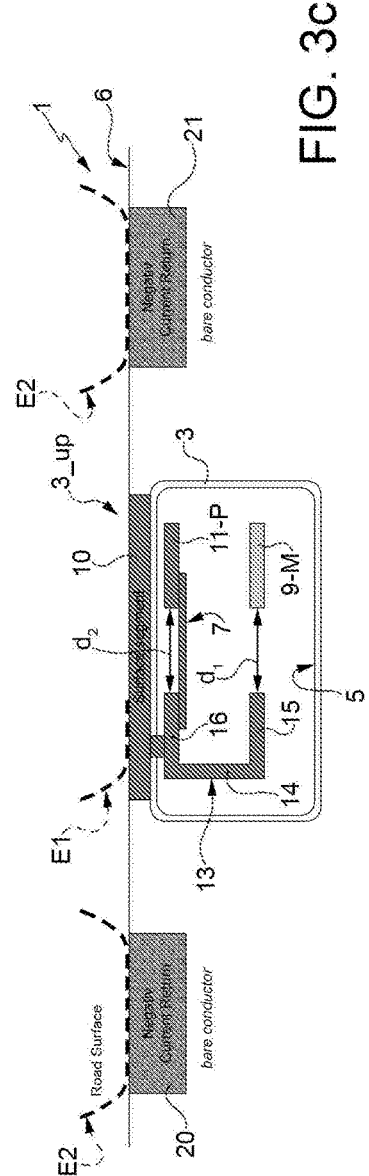
FIG. 3a
FIG. 3b
FIG. 3c

SELF-INSULATED MODULAR POWER SUPPLY LINE

TECHNICAL FIELD

The present invention concerns a self-insulated modular power supply line.

BACKGROUND ART

The patent EP-B-0761493 describes a modular power supply line in which each module comprises an elongated casing made of insulating material defining an inner cavity which extends in a rectilinear direction. The insulating casing, in use, is adapted to be embedded in a road surface with an upper portion thereof flush with said road surface. The inner cavity houses a flexible belt element provided with portions made of ferromagnetic material adapted to interact with the magnetic field generated by a vehicle (for example a railway vehicle) which moves along the power supply line.

The power supply line furthermore comprises a plurality of flat conducting elements borne by the upper portion of the casing, aligned in a rectilinear direction and substantially flush with the road surface.

In the absence of magnetic attraction, the belt element is arranged, throughout the length of the module, in an idle position in which it is substantially rectilinear and not deformed and the conducting elements are not powered and/or are connected to a negative reference potential (ground). The power supply line therefore automatically goes to a state of insulation, in the absence of magnetic activation.

In the presence of magnetic attraction originating from the vehicle that passes over the casing, the portion of belt element affected by the magnetic field bends upwards, deforming roughly in the shape of a sine wave; said raised portion of the belt element arranged in an activation position creates an electrical bridge connection between a positive power supply line inside the casing and at least one conducting element which is connected to the positive power supply line. The conducting elements arranged at the sides of the element are connected to the reference potential (ground).

The movement of the vehicle with respect to the casing moves the raised portion of the belt element along the inner cavity, allowing sequential power supply of the conducting elements.

The electric vehicle is provided with a collector device which creates the above-mentioned magnetic attraction and allows the live conducting element to be connected to an electrode which provides the power supply for the electric vehicle.

The above-mentioned self-insulated power supply line has a series of drawbacks including:
a) the problems connected with ensuring the safety of the flat conducting elements and therefore maintenance of the above-mentioned state of insulation;
b) use of the line in disturbed external ambient conditions which can induce surface dispersion currents that spread over the road surface from the live flat conducting elements;
c) safe management of the conducting elements in the event of malfunctioning or breakdown of the line.

In relation to point b) illustrated above, during normal operation, the self-insulated lines of the above-mentioned type are not able to provide and above all maintain over time a high level of insulation between the conducting elements powered and those connected to the reference potential for a plurality of reasons including:
  intrinsic operation of the above-mentioned line in which the conducting elements are connected in sequence to the positive power supply line and to the earth line—for this reason the physical distance between conducting elements with opposite polarities is limited to allow power supply continuity to the moving vehicle;
  the conducting elements are positioned and installed on the road surface which guarantees a sufficient level of insulation only in certain operating conditions (perfectly dry and completely clean road surface).

In the presence of dampness, dirt or water on the road surface the insulation level drops to very low values.

Due to said poor insulation, a dispersion current is present—in almost all operating conditions of the line—which flows between the live conducting elements and those connected to the reference potential.

The main problems connected with the presence of this dispersion current are the following:
  the dispersion current cannot be discriminated from the traction current absorbed by the vehicle;
  the dispersion current is incorporated in the measurement of the overall current delivered; and
  the dispersion current could generate dangerous potentials on the road surface.

The patent WO 98/36933 describes a power supply line of the type described in the patent EP-B-0761493 and provided with a series of sensors (switches) which are closed by the belt element arranged in the idle position and opened by the belt element arranged in the activation position. In particular the sensors comprise conductive pads electrically spaced from one another and borne by the casing and interconnection means borne by the belt element and adapted to provide an electrical bridge connection between the conductive pads for the portions of the belt element arranged in the idle position.

According to a variation described at the end of the document WO 98/36933, a resistance measuring device is used adapted to measure the resistance between conductive pads and metallic portions of the casing to detect, in the case of low resistance, the presence of conducting agents (such as water and steam) inside the casing.

The document WO 98/36933 does not provide only indications on the insulation inside the casing and cannot provide any indication of, the dispersion condition outside the casing. In particular, the solution described at the end of the document WO 98/36933 is not able to detect the surface dispersion currents that spread over the road surface from the live flat conducting elements when the road surface is partially conducting.

DISCLOSURE OF INVENTION

The object of the present invention is to provide a self-insulated power supply line that solves the drawbacks of the known lines.

The preceding object is achieved by the present invention since it concerns a self-insulated power supply line for vehicles in which a flexible belt element provided with portions made of ferromagnetic material is housed inside an elongated cavity made in an insulating protective casing and is configured to be mobile, following magnetic attraction originating from the outside of the insulating casing, between:—a low position in idle deformation in which the belt element provides a bridge connection between a first power supply line inside the casing and at least one conducting element outside said casing and belonging to a plurality of conducting elements spaced from one another along said casing; and—a high position of activated deformation in which a magnetically attracted portion of the belt element provides an electrical bridge contact between a second power supply line inside the casing and at least one conducting element to allow the power supply of said conducting element for traction of the vehicle; the movement of the vehicle along said line moving the deformed portion of said belt element inside said casing to allow the sequential power supply of conducting elements;

said insulated line comprising at least one traction current return power supply line outside said casing and accessible from said road surface, characterised in that it comprises detector means adapted to detect the presence of a current in the first power supply line to detect a potential danger; said detector means being furthermore adapted to measure the dispersion current ($I_L$) which flows in the first power supply line (9-M) following electrical dispersion on the road surface between the live conducting element and conducting elements adjacent to it; said detector means being adapted to distinguish between:

a) a normal operating condition if said dispersion current is present but below a threshold value; and b) a condition of real risk when said dispersion current is higher than said threshold.

BRIEF DESCRIPTION OF THE DRAWINGS

The invention will now be illustrated with reference to the accompanying drawings which illustrate a preferred embodiment thereof in which:

FIGS. 3-A, 3-B and 3-C illustrate three sections according to planes A-A, B-B and C-C of the line shown in FIG. 2.

BEST MODE FOR CARRYING OUT THE INVENTION

In the attached figures the reference number 1 indicates, as a whole, a self-insulated power supply line.

The power supply line 1 is of known type, for example of the type described in the document EP-B-0761493.

For this reason the power supply line 1 will be described schematically.

Figure 1:
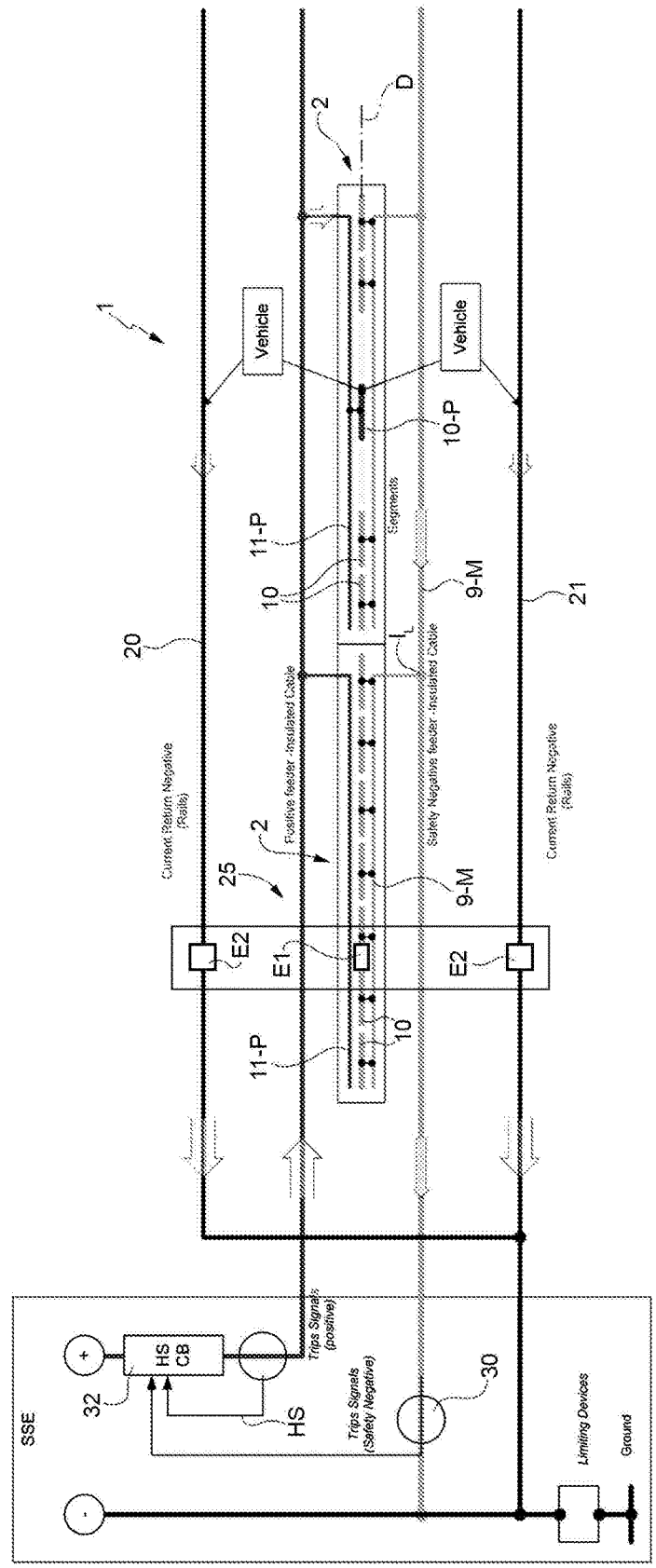
FIG. 1 illustrates in an overhead view and in a schematic manner a power supply line produced according to the present invention.

In particular the power supply line 1 comprises a plurality of modules 2 coupled to one another (for the sake of simplicity two modules are illustrated in FIG. 1). Each module comprises an elongated casing 3 (shown schematically in FIGS. 3-A, 3-B and 3-C) made of insulating material defining an inner cavity 5 (in the example with rectangular section) which extends in a rectilinear direction D (FIG. 1).

The insulating casing 3, in use, is adapted to be embedded in a road surface 6 with an upper portion 3-up thereof flush with said road surface 6.

The inner cavity 5 houses a flexible belt element 7 provided with portions made of ferromagnetic material 8 (FIG. 2) adapted to interact with the magnetic field generated by a vehicle 9 (for example a railway vehicle which moves along rails, not illustrated) with the characteristics that will be described below.

The power supply line 1 comprises a plurality of flat conducting elements 10 borne by the upper portion 3-up of the casing 3, aligned along the direction D and flush with the road surface 6.

In the absence of magnetic attraction, the belt element 7 is arranged throughout the length of the module in a low idle position (FIG. 3-A) in which it is substantially rectilinear and not deformed and the conducting elements 10 are not powered and/or are connected to a first negative reference power supply line 9-M (ground).

In the presence of magnetic attraction originating from the vehicle passing over the casing 3, the portion of belt element 7 affected by the magnetic field bends upwards (FIGS. 2 and 3-B) deforming roughly in the shape of a sine wave (FIG. 2) with the formation of an upper contact portion 7-up in which the belt element 7 creates an electrical bridge connection between a second positive power supply line 11-P inside the casing 3 (FIGS. 3-A-3-C) and at least one conducting element 10-p which is connected to the positive power supply line 11-P. The conducting elements 10 arranged at the sides of the element 10-P are connected to the first reference power supply line 9-M (ground).

The power supply line 11-P has dimensions such as to permit the flow of a current sufficient to ensure the power supply of a railway vehicle, for example 800-1200 amperes.

In the example shown (FIGS. 3-A-3-C), each conducting element 10 is connected to a commutator 13 housed in the casing and having a substantially C-shaped section since it comprises a vertical portion 14, a lower flat horizontal portion 15 and an upper horizontal portion 16 facing the portion 15. The first power supply line 9-M comprises a conducting element substantially flush with the lower portion 15 and spaced from it by a distance d1 while the second power supply line 11-P comprises a conducting element substantially flush with the upper portion 16 and spaced from it by a distance d2.

The belt element 7 has a width d3 greater than d1 or d2 and provides a bridge connection:

between the first power supply line 9-M and the lower portion 15 when the belt element 7 is arranged in the lower non-deformed position (FIG. 3-A)—in this way, the commutator 13 connects a conducting element 10 to the first power supply line 9-M; and between the second power supply line 11-M (FIG. 3-C) and the upper portion 16 when the belt element 7 is arranged in the upper deformed position—in this way, the commutator 13 connects a conducting element 10 to the second power supply line 11-P.

The power supply line 1 furthermore comprises a first and a second power line for the traction current return 20, 21 aligned in the direction D, external to the casing 3 and arranged on the road surface on opposite sides of the conducting elements 10. The power supply lines for the traction current return 20 have dimensions such as to permit the flow of a current sufficient to ensure the power supply of a railway vehicle, for example 800-1200 amperes.

The movement of the vehicle 9 with respect to the casing 3 moves the raised portion 7-up of the belt element 7 along the inner cavity 5 allowing sequential power supply of the conducting elements 10.

The electric vehicle 9 is provided with a collecting device 25 which creates the above-mentioned magnetic attraction and allows connection of the live conducting element 10-P to a first electrode E1 which supplies the positive power supply for the electric vehicle 9.

The traction current return is ensured by a pair of second electrodes E2 which couple with the first and the second current return line 20, 21.

In use, the electric vehicle 9 is arranged above the power supply line 2 with the collector 25 facing the conducting elements 10. The collector 25 is lowered until a bottom wall thereof is resting on the road surface 6.

Figure 2:
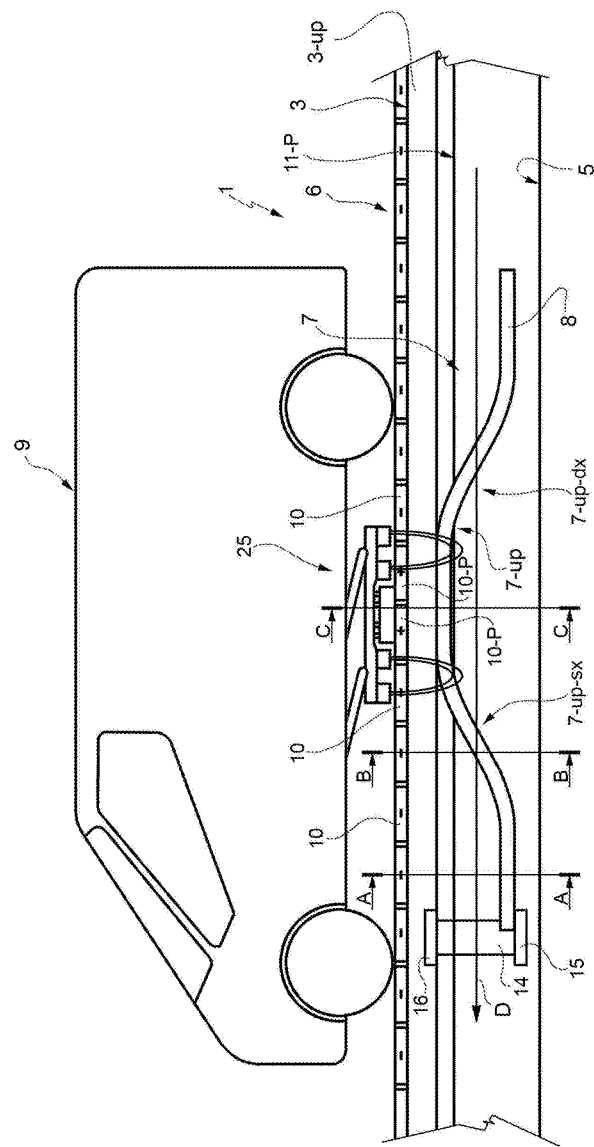
FIG. 2 illustrates in a lateral view and longitudinal section the line of FIG. 1.

In this position, the magnets borne by the collector move closer to the belt element which is contained inside the casing 3; the field lines that extend from the magnets close via a respective portion 7-up-sx and 7-up-dx of the belt element which is raised and bent, deforming in the shape of a wave (FIG. 2).

The first electrode E1 of the collector is arranged in contact with the conducting element 10-P connected to the positive power supply line 11-P thus permitting powering of the motor of the electric vehicle 9 which can be moved with respect to the casing 3 under the thrust of its motor. The second electrodes E2 borne by the collector 25 slide continuously over the first and second current return line 20, 21 ensuring the return of the traction current. Unlike the system described in the document EP-B-0761493, the first power supply line 9-M does not carry traction current; as will be clarified below, in normal operating conditions the first power supply line 9-M does not carry any current.

The variation of the relative position of the vehicle 9 with respect to the casing 3 means that a different portion of the belt element 7 is deformed upwards and therefore the conducting element which was previously powered is de-powered and an adjacent conducting element 10 is connected to the line 11. The conducting elements 10 are thus powered in sequence following movement of the deformed portion of the belt element inside the casing. Due to the arrangement illustrated above, the live conducting element 10 is always covered by the casing (not illustrated) of the collector 25 thus guaranteeing the safety of the line and the connection between the first electrode E1 and the live conducting element 10.

The conducting elements 10 not connected to the positive voltage are automatically connected to the first power supply line 9-M.

In many operating conditions, the road surface 6 is in a bad state of insulation (for example due to the presence of dampness, water, debris or liquids on the road surface); in these conditions a dispersion current $I_L$ passes between the live conducting element 10 and the conducting elements 10 connected to the reference potential; in these abnormal situations, a current is created that flows along the power supply line 9-M. According to the present invention a current different from zero is detected (indication of potential danger) and the time trend of the current is analysed in order to identify a situation of real danger.

According to the present invention, a current detector device 30 is provided (shown schematically in FIG. 1) adapted to detect and measure the dispersion current ($I_L$) which flows in the first power supply line 9-M towards the negative point (ground).

Said current detector 30 is adapted to detect the presence of the current (and therefore is adapted to detect a situation of potential danger). The current detector is therefore adapted to distinguish between:
a) a condition of normal operation which is verified when the dispersion current measured is almost null or in any case below a threshold value $I_S$; ($I_L < I_S$, e.g. 80 Amp) and
b) a condition of real risk when the dispersion current measured is higher than the threshold $I_S$ ($I_L > I_S$).

In case b), a high dispersion current can generate potentially dangerous voltages on the road surface (for example higher than 50 V) for a user who passes over the road surface and comes into contact with or treads on a conducting element. In said condition b) the current detector 30 is adapted to send a command HS towards a control unit 32 of the positive power supply line 11-P to interrupt the power supply to the line 1.

Typically the current detector 30 is adapted to measure the variation over time $(d(I_L)(d(t))$ of the dispersion current so as to verify the presence of a dangerous trend of the dispersion current.

In this case, the current detector is adapted to distinguish between:
a1) the condition of normal operation when the variation in the dispersion current time is below a threshold $I_D$; and
b1) a condition of real risk if the variation in the dispersion current time is higher than the threshold $I_D$.

Case a1) indicates a gradual increase in the loss current which can indicate a progressive transition of the road surface from a dry condition to a condition covered in water following atmospheric events. These are normal operating conditions that do not necessarily entail a risk for the users.

Condition b1), on the other hand, can indicate a fault along the line due, for example, to non-return of the flexible element to the idle position following the magnetic attraction thereof.

NUMERICAL EXAMPLES

The value of the acceptable dispersion currents depends on the electrical sizing of the conductor that constitutes the first power supply line 9-M and the maximum distance of the line itself from the protections.

For example, a section of the above-mentioned conductor equal to 240 mm$^2$ of copper (or copper equivalent) and a maximum distance of 3 km from the protection guarantees a voltage of the accessible elements below 50 V for continuous dispersion currents up to 200 Amperes. Said values can be achieved only in the presence of several cm of water with high conductivity 0.05-0.1 S/m.

Above said value, the power supply to the line 1 is interrupted (command .HS.). Even much higher current values, in relation to the type of environment where the system is installed, can be considered acceptable, proportionally increasing the conductor section.

A sudden variation, on the other hand, is independent of the absolute value of the currents involved, and depends only on their gradient.

Also in this case, the power supply to the line 1 is interrupted (command .HS).

The invention claimed is:

1. A self-insulated power supply line for a vehicle, the self-insulated power supply line comprising:
    an insulating protective casing forming an elongated cavity;
    a plurality of conducting elements external to the insulating protective casing;
    a flexible belt element including portions made of ferromagnetic material, the flexible belt element being housed inside the elongated cavity of the insulating protective casing;
    wherein, responsive to magnetic attraction originating from outside the insulating protective casing, the flexible belt element is configured to be mobile between:
        a low position in idle deformation, wherein a portion of the flexible belt element that is in the low position forms a bridge connection between a first power supply line inside the insulating protective casing and at least one of the plurality of conducting elements; and a high position of activated deformation, wherein a portion of the flexible belt element that is in the high position forms a bridge electrical contact between a second power supply line inside the insulating protective casing and at least one of the plurality of conducting elements due to the magnetic attraction to allow power supply to the at least one of the plurality of conducting elements for traction of the vehicle;

wherein movement of the vehicle along the self-insulated power supply line creates movement of the flexible belt element between the low position and the high position to allow sequential power supply of the plurality of conducting elements; and at least one traction current return electric line external to the insulating protective casing and accessible from a road surface, wherein the at least one traction current return electric line comprises detecting means adapted to measure the presence of a dispersion current in the first power supply line to detect a potential danger; the detecting means being furthermore adapted to measure the dispersion current running in the first power supply line following electrical dispersion on the road surface between one of the plurality of conducting elements that is live and another of the plurality of conducting elements adjacent to the one of the plurality of conducting elements that is live;

wherein the detecting means are adapted to distinguish between:
a) a normal functioning condition when the dispersion current is present but is below a first threshold value; and
b) a real risk condition when the dispersion current is higher than the first threshold value.

2. The power supply line according to claim 1, wherein the detecting means are enabled to measure the change over time of the dispersion current;

the detecting means being adapted to distinguish between:
the normal functioning condition when the change over time of the dispersion current is lower than a second threshold value, and
a condition of real risk when the change over time of the dispersion current is higher than the second threshold value.

3. A self-insulated power supply line for a vehicle, the self-insulated power supply line comprising:
an insulating protective casing forming an elongated cavity;
a plurality of conducting elements external to the insulating protective casing;
a flexible belt element including portions made of ferromagnetic material, the flexible belt element being housed inside the elongated cavity of the insulating protective casing;

wherein, responsive to magnetic attraction originating from outside the insulating protective casing, the flexible belt element is configured to be mobile between:
a low position in idle deformation, wherein a portion of the flexible belt element that is in the low position forms a bridge connection between a first power supply line inside the insulating protective casing and at least one of the plurality of conducting elements; and
a high position of activated deformation, wherein a portion of the flexible belt element that is in the high position forms a bridge electrical contact between a second power supply line inside the insulating protective casing and at least one of the plurality of conducting elements due to the magnetic attraction to allow power supply to the at least one of the plurality of conducting elements for traction of the vehicle;

wherein movement of the vehicle along the self-insulated power supply line creates movement of the flexible belt element between the low position and the high position to allow sequential power supply of the plurality of conducting elements; and at least one traction current return electric line external to the insulating protective casing and accessible from a road surface, the at least one traction current return electric line including a detector adapted to measure the presence of a dispersion current in the first power supply line to detect a potential danger; the detector being further adapted to measure the dispersion current running in the first power supply line following electrical dispersion on the road surface between one of the plurality of conducting elements that is live and another of the plurality of conducting elements adjacent to the one of the plurality conducting elements that is live;

wherein the detector is adapted to distinguish between:
a) a normal functioning condition when the dispersion current is present but is below a first threshold value; and
b) a real risk condition when the dispersion current is higher than the first threshold value.

4. The power supply line according to claim 3, wherein the detector is enabled to measure the change over time of the dispersion current; and wherein the detector being adapted to distinguish between:
the normal functioning condition when the change over time of the dispersion current is lower than a second threshold value, and
a condition of real risk when the change over time of the dispersion current is higher than the second threshold value.

* * * * *